(12) United States Patent
Wang et al.

(10) Patent No.: US 8,764,312 B2
(45) Date of Patent: Jul. 1, 2014

(54) OPTICAL CONNECTOR PLUG HAVING IMPROVED LATCHING MECHANISM

(75) Inventors: Chien-Chiung Wang, New Taipei (TW); Qing-Man Zhu, Kunshan (CN); Xue-Liang Zhang, Kunshan (CN)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 191 days.

(21) Appl. No.: 13/271,243

(22) Filed: Oct. 12, 2011

(65) Prior Publication Data

US 2012/0093466 A1 Apr. 19, 2012

(30) Foreign Application Priority Data

Oct. 19, 2010 (CN) .......................... 2010 1 0511917

(51) Int. Cl.
*G02B 6/36* (2006.01)
(52) U.S. Cl.
USPC .............................................. 385/77; 385/73
(58) Field of Classification Search
USPC ............................... 385/59, 60, 71–73, 75–78
See application file for complete search history.

(56) References Cited

U.S. PATENT DOCUMENTS

| 5,214,730 A | | 5/1993 | Nagasawa et al. | |
|---|---|---|---|---|
| 5,542,015 A | * | 7/1996 | Hultermans | 385/60 |
| 5,590,229 A | * | 12/1996 | Goldman et al. | 385/59 |
| 5,734,558 A | | 3/1998 | Poplawsky et al. | |
| 5,828,805 A | | 10/1998 | Morlion et al. | |
| 6,259,856 B1 | * | 7/2001 | Shahid | 385/147 |
| 6,811,321 B1 | * | 11/2004 | Schmalzigaug et al. | 385/59 |
| 6,988,834 B2 | * | 1/2006 | Chen et al. | 385/78 |
| 7,077,576 B2 | * | 7/2006 | Luther et al. | 385/59 |
| 7,341,381 B2 | * | 3/2008 | Shimoji et al. | 385/76 |
| 7,429,136 B2 | * | 9/2008 | Lewallen et al. | 385/71 |
| 8,109,679 B2 | * | 2/2012 | Danley et al. | 385/85 |
| 8,231,283 B2 | * | 7/2012 | Sabo | 385/78 |

FOREIGN PATENT DOCUMENTS

| CN | 101365972 A | 2/2009 |
|---|---|---|
| JP | 2008-191187 | 8/2008 |
| TW | 201038988 A | 11/2010 |

* cited by examiner

*Primary Examiner* — Daniel Petkovsek
(74) *Attorney, Agent, or Firm* — Wei Te Chung; Ming Chieh Chang

(57) ABSTRACT

An optical connector assembly (1000) includes an optical connector plug (100) and an optical connector receptacle (600). The optical connector plug includes a base (3), a head portion (1) and a pair of springs (2) compressed between the base and the head portion. The base includes a body portion (30) and a pair of beam portions (31) formed at opposite sides of the body portion. Each beam portion has a guiding portion (310) extending from the body portion, a lever (312) and a latching portion (311). The head portion carries a number of fibers and includes a securing portion (10) defining a pair of guiding recesses (12). The guiding portions are slidably mounted to the guiding recesses. The latching portions retain the securing portion in position relative to the body portion against a restoring force of the springs.

5 Claims, 6 Drawing Sheets

OPTICAL CONNECTOR PLUG HAVING IMPROVED LATCHING MECHANISM

BACKGROUND OF THE INVENTION

1. Field of the Invention

The present invention relates to an optical connector plug and an optical connector assembly having the same, and more particularly to an optical connector plug and an optical connector assembly applied in an optical or optoelectronic device, or optical or optoelectronic integrated circuit, for providing a low loss optical coupling between the fibers and the device or integrated circuit for optical signal transmission.

2. Description of Related Art

U.S. Pat. No. 5,214,730 issued to Nagasawa et al. on May 25, 1993 discloses an optical connector plug. The optical connector plug includes a housing, a ferrule defining a pair of inserting holes and received in the housing, a holding member supporting the ferrule, a spring disposed behind the ferrule, a plurality of optical fibers inserted to the front side of the ferrule. When the optical connector plug mates with a mating connector of similar structure but having a pair of guiding pins, the ferrules are aligned, making the mating fibers properly align with each other with the help of the springs. The aligned state is maintained by means of a clamp spring member or the like that hooks on rear sides of the connector plugs.

U.S. Pat. No. 5,828,805 issued to Morlion et al. on Oct. 27, 1998 discloses an optical connector plug. The optical connector plug comprises a coupling body, a head portion for receiving a plurality of optical fibers slidable in the coupling body, and a coupling sleeve enclosing the coupling body and being slidable on the coupling body from a coupling position to a withdrawn decoupling position. In the coupling position, the coupling sleeve engages with two recesses provided in opposite sides of the coupling body. Decoupling of the connector plug is achieved by moving the coupling sleeve into the withdrawn decoupling position against the action of a spring means. To facilitate the operation of the coupling sleeve, a pair of operating lips are provided at two opposite sides.

SUMMARY OF THE INVENTION

Accordingly, an object of the present invention is to provide an optical connector plug fixed to a mating connector reliably by an improved latching mechanism in a simple configuration, and an optical connector assembly having the same.

In order to achieve the object set forth, an optical connector assembly includes an optical connector plug and an optical connector receptacle. The optical connector plug includes a base, a head portion and a pair of springs compressed between the base and the head portion. The base includes a body portion and a pair of beam portions formed at opposite sides of the body portion. Each beam portion has a guiding portion extending from the body portion, a lever and a latching portion. The head portion carries a number of fibers and includes a securing portion defining a pair of guiding recesses. The guiding portions are slidably mounted to the guiding recesses. The latching portions retain the securing portion in position relative to the body portion against a restoring force of the springs.

The pair of latching portions of the optical connector plug have simple configurations and latch with the optical connector receptacle easily and reliably.

Other objects, advantages and novel features of the invention will become more apparent from the following detailed description when taken in conjunction with the accompanying drawings.

DETAILED DESCRIPTION OF THE PREFERRED EMBODIMENT

Reference will now be made in detail to the preferred embodiment of the present invention.

Figure 1:
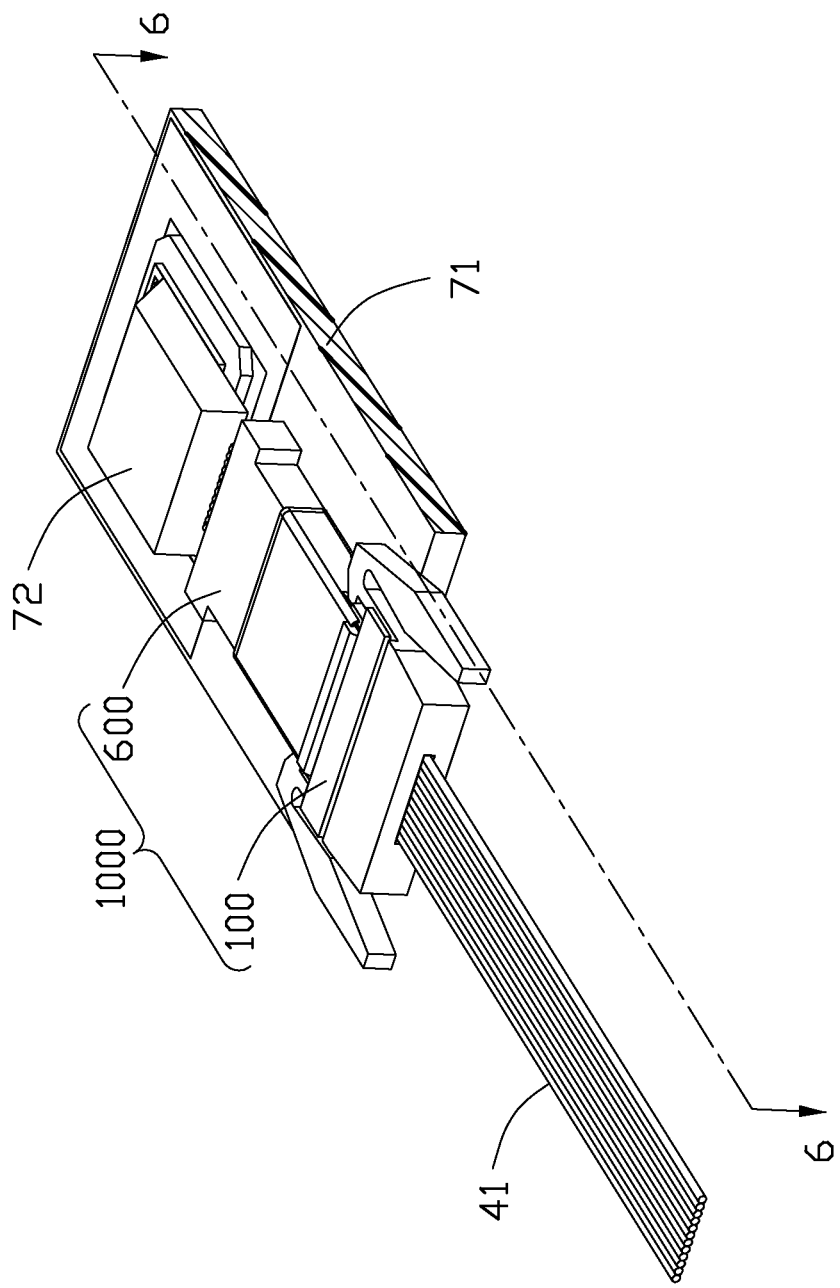
FIG. 1 is an assembled perspective view showing an optical connector assembly mounted in a host device in accordance with the present invention.
Figure 2:
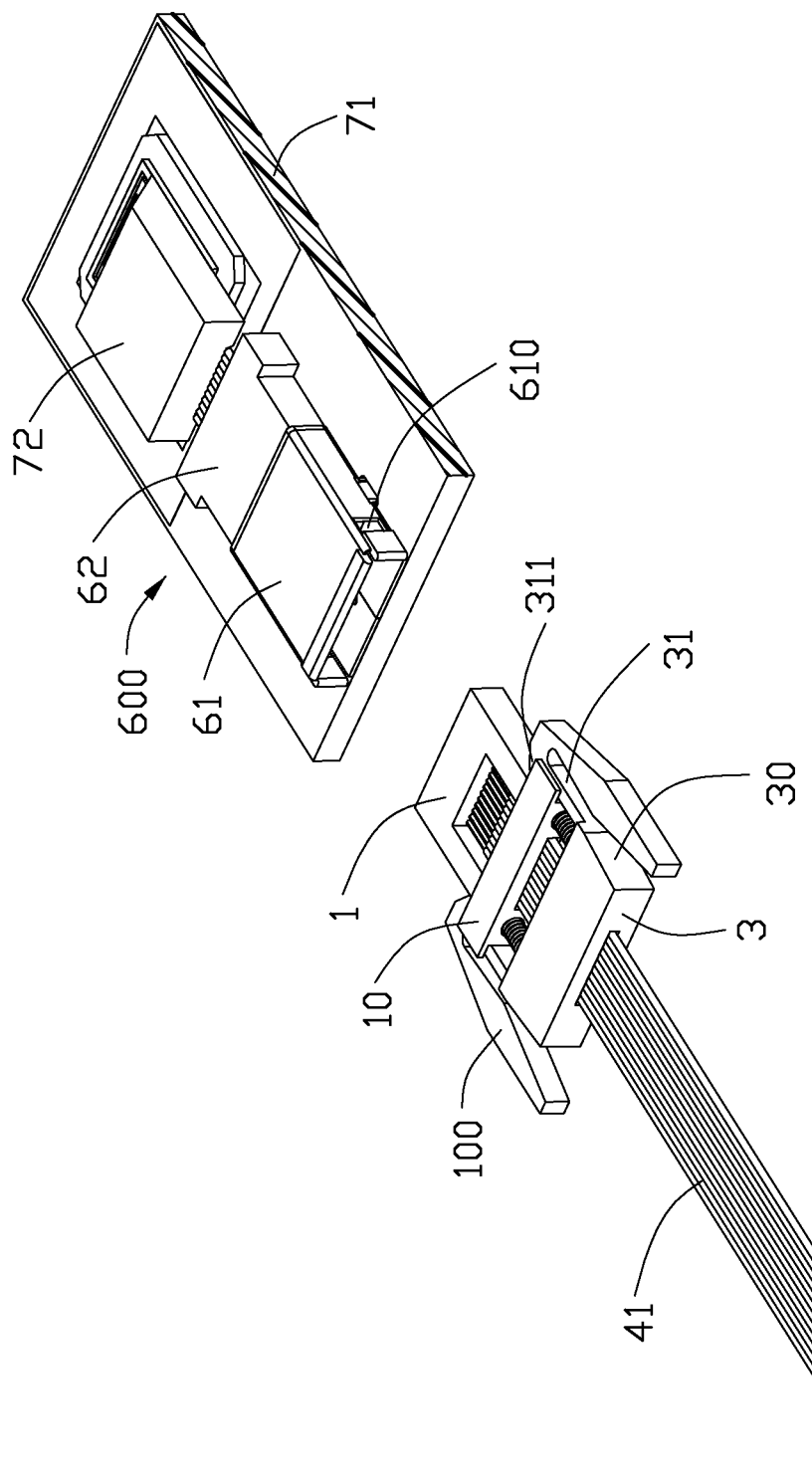
FIG. 2 is a perspective view showing an optical connector plug and an optical connector receptacle shown in FIG. 1.

Referring to FIGS. 1 and 2, an optical connector assembly 1000 in accordance with the present invention is used to connect optical fibers 41, 42 to a host device, e.g., an optical or optoelectronic device, or optical or optoelectronic integrated circuit, for providing a low loss optical coupling between the fibers 41, 42 and the device or integrated circuit. The optical connector assembly 1000 comprises an optical connector plug 100 and an optical connector receptacle 600.

Referring to FIGS. 2-5, the optical connector plug 100 includes a base 3, a head portion 1, and a pair of springs 2 between the base 3 and the head portion 1. The base 3 comprises a body portion 30, and a pair of beam portions 31 formed at opposite sides of the body portion 30. The body portion 30 defines a receiving groove 301 extending therethrough along a mating direction for insertion of the fibers 41. The body portion 30 has a pair of inserting holes 302 defined at opposite sides of the receiving groove 301. The pair of inserting holes 302 extend from a front face of the body portion 30 to an inner portion of the body portion 30.

Figure 5:
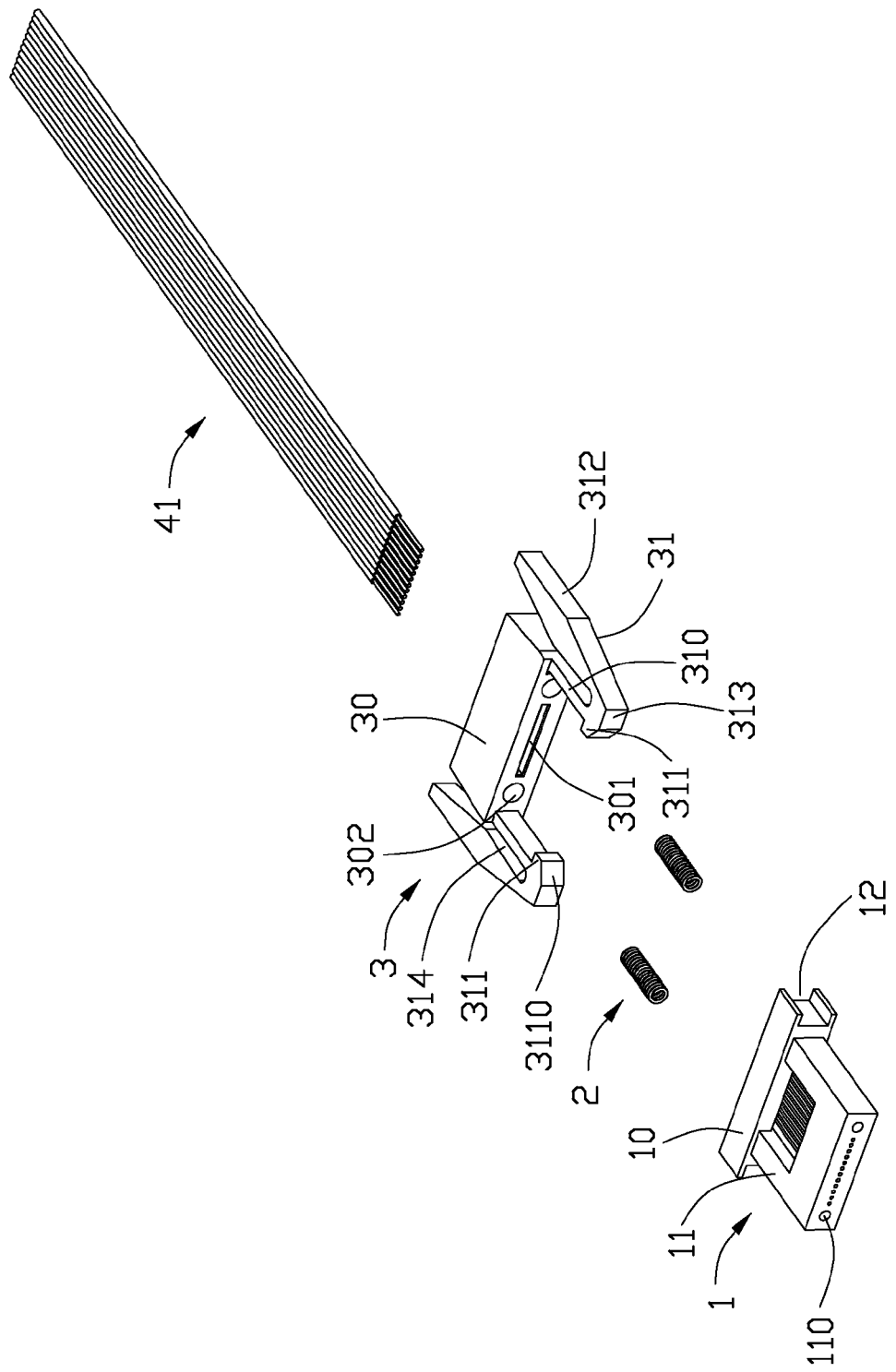
FIG. 5 is an exploded view similar to FIG. 4, taken from another aspect.

Each beam portion 31 includes a guiding portion or inner arm 310 extending forwardly from the front face of the body portion 30, a lever or outer arm 312 connected with the guiding portion 310 through a connecting portion 313, and a latching portion 311 projecting inwardly from the connecting portion 313. The beam portion 31 is formed into substantially a U-shape, and has a slot 314 defined between the guiding portion 310 and the lever 312. Referring to FIG. 5, the latching portion 311 is formed with a first corner 3110. In conjunction with FIG. 6, each lever 312 has a protrusion or fulcrum 3120 projecting from a substantially middle portion of the lever 312 to the slot 314.

The head portion 1 includes a securing portion 10 and a tongue portion 11 extending forwardly from the securing portion 10. The head portion 1 has a receiving channel 101 defined through the securing portion 10 and into the tongue portion 11, and a pair of mounting holes 102 defined at opposite sides of the receiving channel 101. The securing portion 10 has a pair of guiding recesses 12 defined at opposite sides of the securing portion 10. The tongue portion 11 defines a pair of guiding holes 110.

Figure 3:
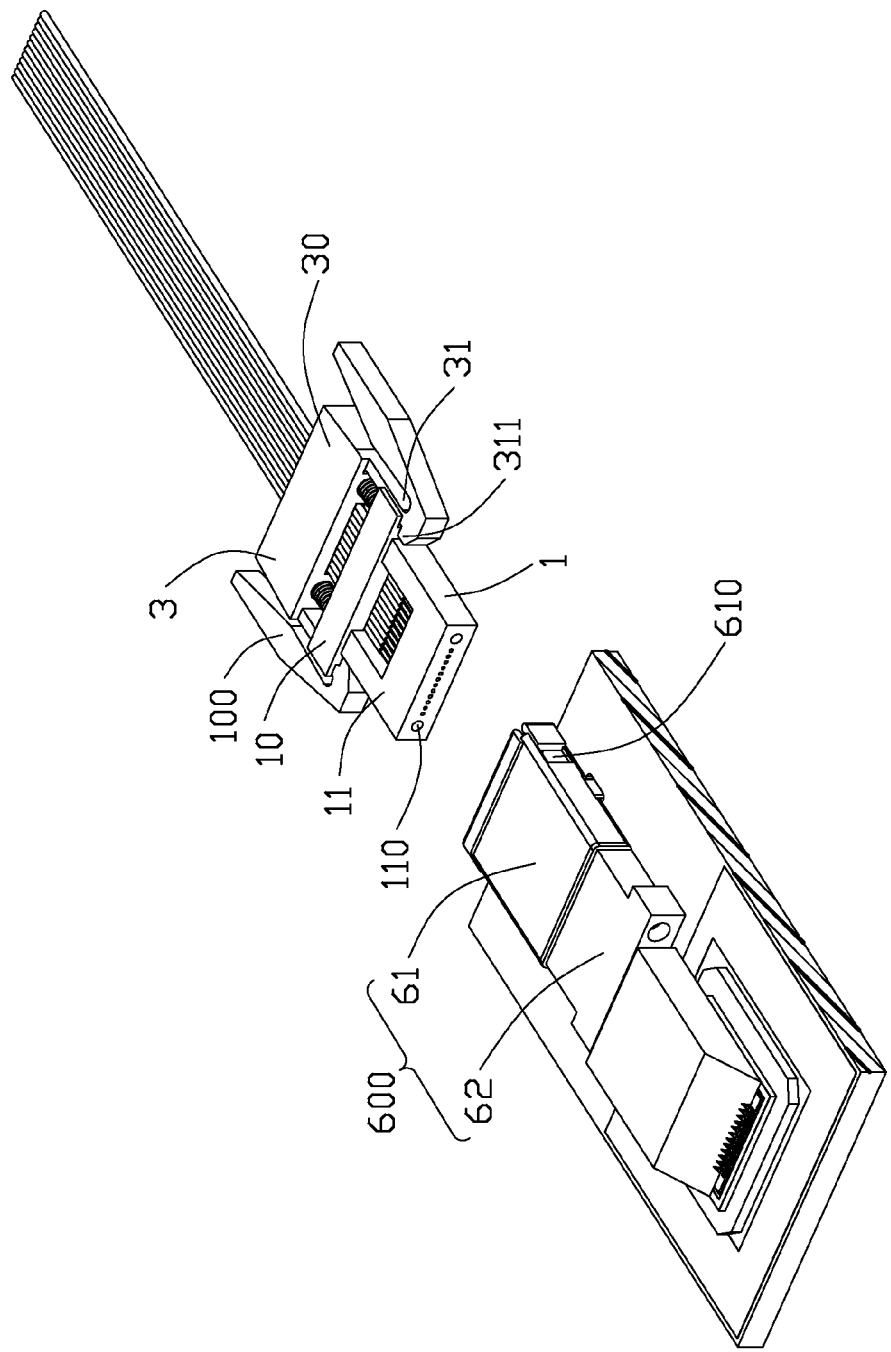
FIG. 3 is a view similar to FIG. 2, taken from another aspect.
Figure 4:
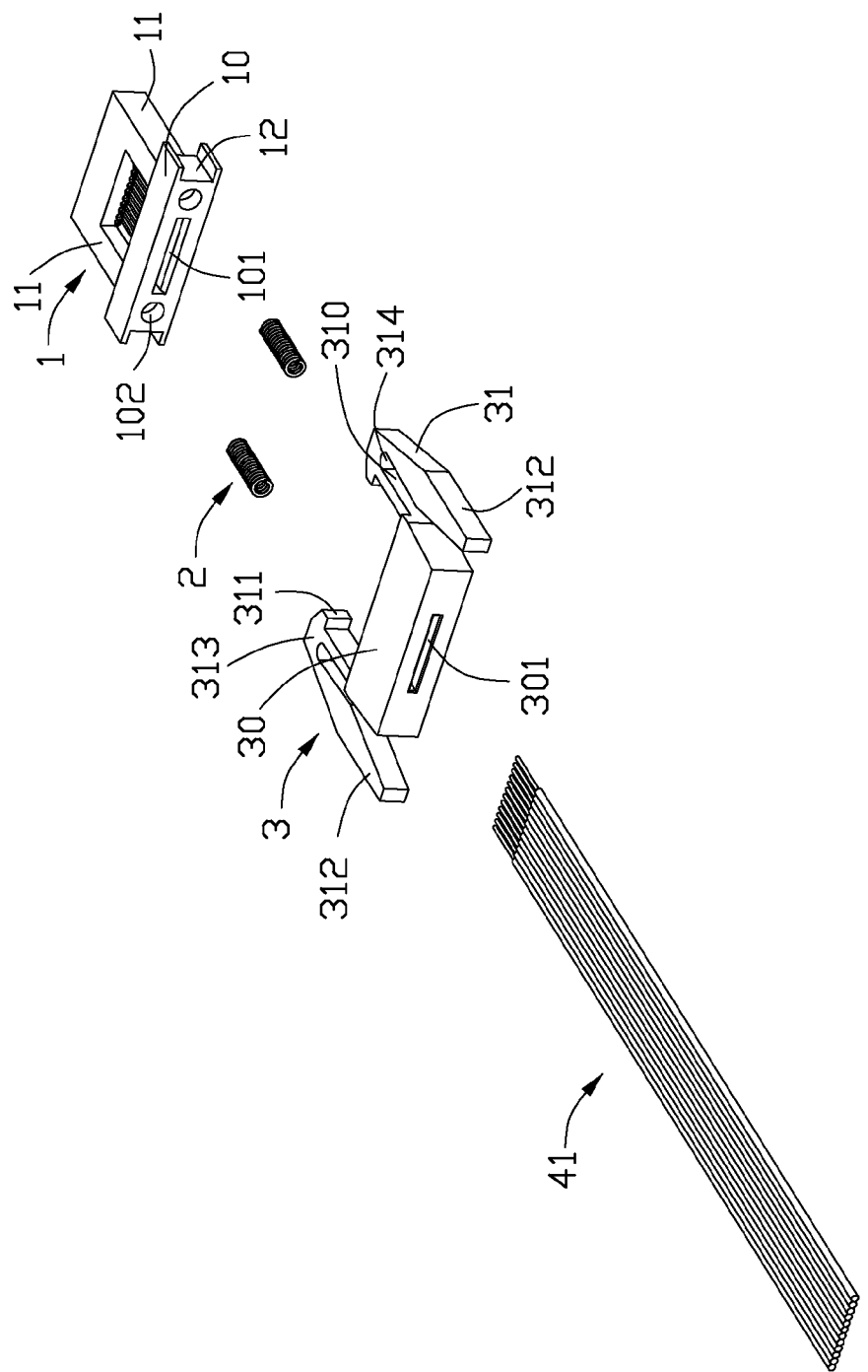
FIG. 4 is an exploded view showing the optical connector plug and fibers.

Referring to FIGS. 1-6, in assembling of the optical connector plug 100, the springs 2 are compressibly mounted between the head portion 1 and the base 3. Each spring 2 has opposite ends respectively received in the mounting hole 102 and the inserting hole 302. The head portion 1 is assembled to the base 3, with the guiding portions 310 sliding along the guiding recesses 12. Referring to FIGS. 2 and 3, the latching portions 311 abut against the securing portion 10 to prevent the head portion 1 from dropping off the base 3. The fibers 41 are inserted into the receiving groove 301 and the receiving channel 101.

Figure 6:
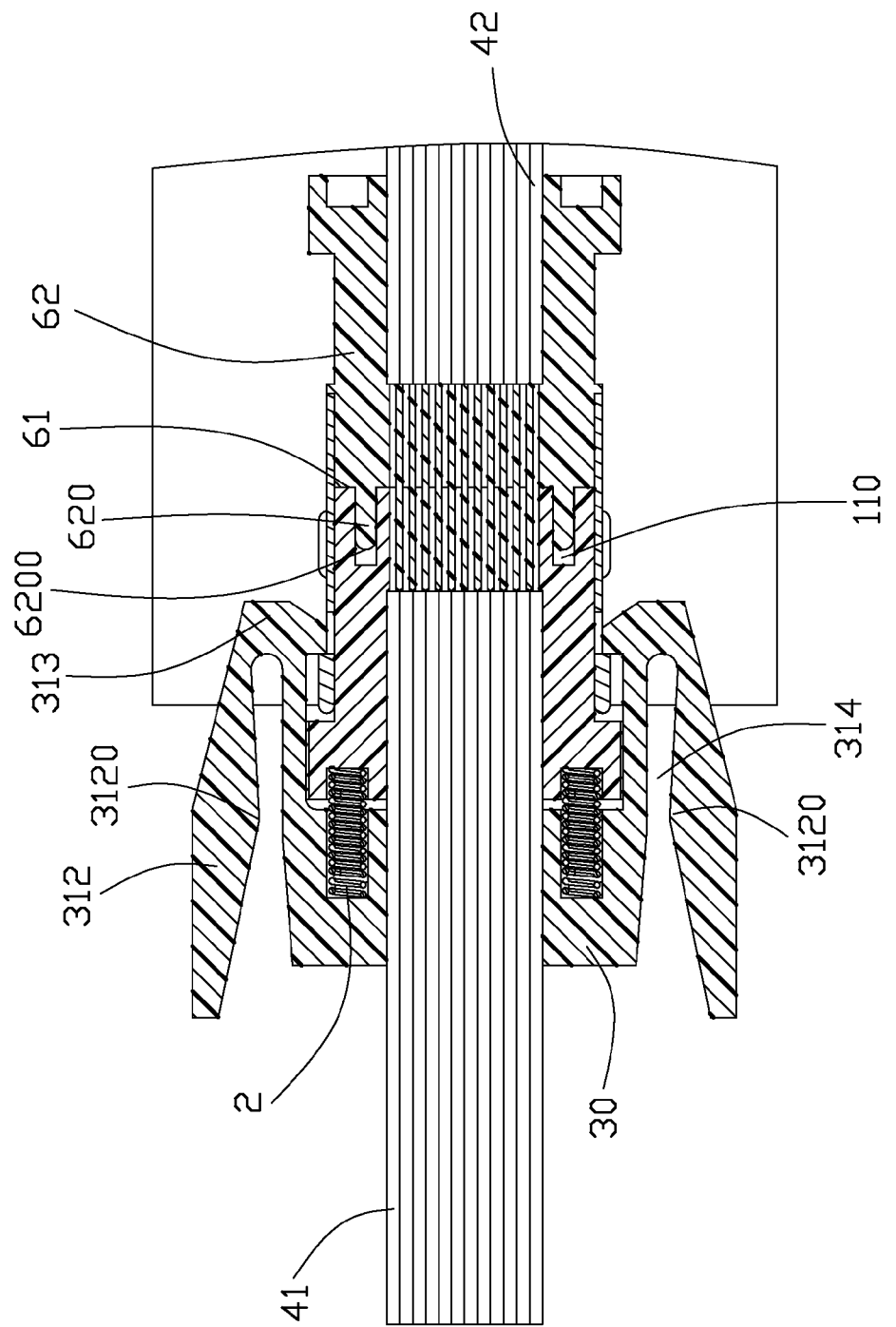
FIG. 6 is a cross-sectional view showing the optical connector assembly, taken along line 6-6 of FIG. 1.

Referring to FIGS. 2, 3 and 6, the optical connector receptacle 600 includes a carriage 62 carrying a plurality of fibers 42, and a cage 61 made of metallic material attached to the carriage 62 and defining a pair of latching recesses 610 at opposite outer sides of the cage 61. The carriage 62 and a converting device 72 are mounted on a mother board 71. The carriage 62 has a pair of guiding pins 620 each having a second corner 6200.

Referring to FIGS. 1-6, in assembling of the optical connector assembly 1000, rear ends of the levers 312 are depressed inwardly, and the levers 312 are pivotal about the protrusions 3120 to outspread the latching portions 311. The tongue portion 11 is inserted in the cage 61 and aligned with the carriage 62, with the securing portion 10 located outwardly of the cage 61, the beam portions 31 attached to an outer side of the cage 61, and the springs 2 compressed. The guiding pins 620 are inserted in the guiding holes 110. When the levers 312 are released, the latching portions 311 latches with the latching recesses 610 firmly. The optical connector plug 100 is secured to the optical connector receptacle 600 reliably, with the fibers 41 aligned with the fibers 42 accurately. A resilient restoring force is provided from the compressed springs 2 when the beam portions 31 are manipulated once more in disassembling the optical connector plug 100 from the optical connector receptacle 600.

The first corner 3110 is used for easing the insertion of the lathing portion 311 with the latching recess 610. The second corner 6200 is used for easing the insertion of the guiding pin 620 into the guiding hole 110.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. An optical connector assembly comprising:
   a plug unit including:
   a base portion and a pair of outwardly deflectable beam portions formed on two lateral sides of the base portion, a first latching portion located on an inner side of each of the corresponding beam portions, each of the beam portions including an inner arm unitarily extending directly from the base portion and an outer arm extending from a front end of the inner arm with a slot between the inner arm and the outer arm under condition the first latching portion is located around the front end of the inner arm, inwardly deflecting the outer arm toward the inner arm may result in abutment between the inner arm and the outer arm to form a fulcrum and further an outward movement of the first latching portion in a level manner about the fulcrum; and
   a head portion assembled to and in front of the base portion with a spring structure therebewteen under a floating manner; wherein the beam portions guide and align a back-and-forth movement of the head portion relative to the base portion in a front-to-back direction between front and rear positions, and the first latching portion prevents excessive forward movement of the head portion toward an excessive position in front of said front position relative to the base portion when said head portion is located in the front position.

2. The optical connector assembly as claimed in claim 1, wherein the base portion defines a passage through which a plurality of optical fibers extend into the head portion.

3. The optical connector assembly as claimed in claim 1, wherein during mating with a receptacle, the plug has the head portion move around the rear position relative to the base portion for allowing second latching portions of the beam potions to lock into corresponding latching recesses in the receptacle so as to have the plug and the receptacle mated with each other securely.

4. The optical connector assembly as claimed in claim 3, wherein said first latching portions and the second latching portions are same one.

5. The optical connector assembly as claimed in claim 1, wherein the outer arm defines an oblique section behind the fulcrum for deflection of the outer arm.

* * * * *